United States Patent
Smith et al.

(10) Patent No.: US 10,049,238 B2
(45) Date of Patent: Aug. 14, 2018

(54) ENCODED INFORMATION READING TERMINAL WITH ITEM LOCATE FUNCTIONALITY

(71) Applicant: METROLOGIC INSTRUMENTS, INC., Blackwood, NJ (US)

(72) Inventors: Taylor Smith, Charlotte, NC (US); Huyu Qu, San Jose, CA (US)

(73) Assignee: METROLOGIC INSTRUMENTS, INC., Blackwood, NJ (US)

( * ) Notice: Subject to any disclaimer, the term of this patent is extended or adjusted under 35 U.S.C. 154(b) by 0 days.

(21) Appl. No.: 15/362,329

(22) Filed: Nov. 28, 2016

(65) Prior Publication Data

US 2017/0076118 A1 Mar. 16, 2017

Related U.S. Application Data (63) Continuation of application No. 13/214,512, filed on Aug. 22, 2011, now Pat. No. 9,507,976.

(51) Int. Cl.
*G06K 7/10* (2006.01)
*G06Q 10/08* (2012.01)
(Continued)

(52) U.S. Cl.
CPC ... *G06K 7/10128* (2013.01); *G06F 17/30964* (2013.01); *G06K 7/0008* (2013.01);
(Continued)

(58) Field of Classification Search
CPC .. G06K 7/0008; G06K 19/0723; G06Q 10/08; G06Q 10/087; G08B 13/2462
See application file for complete search history.

(56) References Cited

U.S. PATENT DOCUMENTS 5,231,273 A 7/1993 Caswell et al.
5,589,844 A 12/1996 Belcher et al.
(Continued)

FOREIGN PATENT DOCUMENTS

| WO | 01/52179 A2 | 7/2001 |
|---|---|---|
| WO | 2007/011863 A2 | 1/2007 |
| WO | 2009/064926 A1 | 5/2009 |

OTHER PUBLICATIONS

Feb. 10, 2015 Search Report issued in European Application No. 14190366.6.
(Continued)

*Primary Examiner* — Andrew Bee
(74) *Attorney, Agent, or Firm* — Oliff PLC; R. Brian Drozd (57) ABSTRACT

An encoded information reading terminal can comprise a microprocessor, a memory communicatively coupled to the microprocessor, a communication interface, and an RFID reading device configured to output raw message data comprising an encoded message and/or output decoded message data corresponding to an encoded message. The EIR terminal can be configured, responsive to receiving one or more target item identifiers, to attempt to locate at least one RFID tag transmitting an encoded representation of a binary string, at least part of which is equal to at least part one of the specified one or more target item identifiers. The EIR terminal can be further configured, responsive to successfully locating at least one RFID tag, to notify a user via a visual message and/or an audible message.

20 Claims, 6 Drawing Sheets

(51) Int. Cl.

| | | |
|---|---|---|
| *G06K 19/07* | (2006.01) | |
| *G06K 7/00* | (2006.01) | |
| *G08B 13/24* | (2006.01) | |
| *G06K 17/00* | (2006.01) | |
| *H01Q 15/00* | (2006.01) | |
| *H01Q 1/24* | (2006.01) | |
| *H01Q 1/38* | (2006.01) | |
| *H01Q 21/08* | (2006.01) | |
| *G06F 17/30* | (2006.01) | |
| *G06K 7/14* | (2006.01) | |

(52) U.S. Cl.
CPC ....... *G06K 7/10079* (2013.01); *G06K 7/1413* (2013.01); *G06K 17/00* (2013.01); *G06K 17/0022* (2013.01); *G06K 19/0723* (2013.01); *G06Q 10/08* (2013.01); *G06Q 10/087* (2013.01); *G08B 13/2462* (2013.01); *H01Q 1/243* (2013.01); *H01Q 1/38* (2013.01); *H01Q 15/0086* (2013.01); *H01Q 21/08* (2013.01)

(56) References Cited

U.S. PATENT DOCUMENTS

| | | | |
|---|---|---|---|
| 5,786,764 | A | 7/1998 | Engellenner |
| 7,190,257 | B2 | 3/2007 | Maltseff et al. |
| 7,786,844 | B2 | 8/2010 | Ehrman et al. |
| 7,812,725 | B2 | 10/2010 | Bolander et al. |
| 7,839,289 | B2 | 11/2010 | Chung et al. |
| 7,844,505 | B1 | 11/2010 | Arneson et al. |
| 7,859,411 | B2 | 12/2010 | Chakraborty |
| 7,868,760 | B2 | 1/2011 | Smith et al. |
| 7,907,053 | B2 | 3/2011 | Wildman et al. |
| 7,909,248 | B1 | 3/2011 | Goncalves |
| 7,916,023 | B2 | 3/2011 | Rado |
| 7,916,025 | B2 | 3/2011 | Locker et al. |
| 7,916,026 | B2 | 3/2011 | Johnson et al. |
| 7,932,809 | B2 | 4/2011 | Nair et al. |
| 7,986,227 | B2 | 7/2011 | Yankelevitz et al. |
| 7,986,239 | B2 | 7/2011 | Chang |
| 8,258,956 | B1 | 9/2012 | Kuzma et al. |
| 8,287,327 | B1 | 10/2012 | Ghaly |
| 2001/0000958 | A1 | 5/2001 | Ulrich et al. |
| 2005/0285742 | A1 | 12/2005 | Charych et al. |
| 2006/0131377 | A1 | 6/2006 | Zimmerman |
| 2007/0017983 | A1 | 1/2007 | Frank et al. |
| 2007/0138260 | A1 | 6/2007 | Keys |
| 2008/0001749 | A1 | 1/2008 | Fein et al. |
| 2008/0102805 | A1 | 5/2008 | Balia et al. |
| 2008/0278370 | A1 | 11/2008 | Lachner et al. |
| 2009/0024550 | A1 | 1/2009 | Wynn et al. |
| 2009/0224923 | A1 | 9/2009 | Abraham, Jr. et al. |
| 2010/0013603 | A1 | 1/2010 | Chatani et al. |
| 2010/0019035 | A1 | 1/2010 | Larson et al. |
| 2010/0060544 | A1 | 3/2010 | Penev et al. |
| 2010/0090807 | A1* | 4/2010 | Tsujimoto ............ G06K 7/0008 340/10.4 |
| 2010/0194604 | A1 | 8/2010 | Ehrman et al. |
| 2010/0201520 | A1 | 8/2010 | Stern et al. |
| 2010/0207738 | A1 | 8/2010 | Bloy |
| 2010/0214067 | A1 | 8/2010 | Mo et al. |
| 2010/0231410 | A1 | 9/2010 | Seisenberger et al. |
| 2010/0276498 | A1 | 11/2010 | Rofougaran et al. |
| 2010/0294840 | A1 | 11/2010 | Barry |
| 2010/0295682 | A1 | 11/2010 | August et al. |
| 2010/0295943 | A1 | 11/2010 | Cha et al. |
| 2010/0328073 | A1 | 12/2010 | Nikitin et al. |
| 2011/0012775 | A1 | 1/2011 | Richards et al. |
| 2011/0032081 | A1 | 2/2011 | Wild |
| 2011/0050397 | A1 | 3/2011 | Cova |
| 2011/0050423 | A1 | 3/2011 | Cova et al. |
| 2011/0068906 | A1 | 3/2011 | Shafer et al. |
| 2011/0068921 | A1 | 3/2011 | Shafer |
| 2011/0090057 | A1 | 4/2011 | Kosecki et al. |
| 2011/0095885 | A9 | 4/2011 | Nielsen et al. |
| 2011/0109434 | A1 | 5/2011 | Hadsall, Sr. |
| 2011/0109442 | A1 | 5/2011 | Pavlov et al. |
| 2011/0130085 | A1 | 6/2011 | Bellows et al. |
| 2011/0148589 | A1 | 6/2011 | Johnson et al. |
| 2011/0148591 | A1 | 6/2011 | Reynolds et al. |
| 2011/0163857 | A1 | 7/2011 | August et al. |
| 2011/0163882 | A1 | 7/2011 | August et al. |
| 2011/0163916 | A1 | 7/2011 | Bamidele |
| 2011/0169657 | A1 | 7/2011 | August et al. |
| 2011/0183688 | A1 | 7/2011 | Dietrich et al. |
| 2011/0309136 | A1 | 12/2011 | Katsakhyan et al. |
| 2012/0075076 | A1 | 3/2012 | Wang |
| 2012/0092134 | A1 | 4/2012 | Stern et al. |
| 2012/0193411 | A1 | 8/2012 | Smith |
| 2012/0206238 | A1 | 8/2012 | Lavedas |
| 2012/0313757 | A1 | 12/2012 | Volpi et al. |
| 2013/0043309 | A1 | 2/2013 | Qu et al. |
| 2013/0043981 | A1 | 2/2013 | Wang et al. |
| 2013/0054390 | A1 | 2/2013 | Kerchner et al. |

OTHER PUBLICATIONS

Mar. 1, 2016 Office Action issued in European Patent Application No. 14 190 366.6.
EPCGLOBAL INC., EPC Radio-Frequency Identity Protocols Class-1 Generation-2 UHF RFID Protocol for Communications at 860 MHz-960 MHz, Version 1.0.9, Jan. 31, 2005, pp. 1-94.
Feb. 8, 2013 Communication pursuant to Aricle 94(3) EPC in European Application No. 12181099.8.
Jan. 23, 2013 European Search Report in European Application No. 12181099.8.
Aug. 4, 2017 Search Report issued in European Patent Application No. 17159331.2.

\* cited by examiner

ENCODED INFORMATION READING TERMINAL WITH ITEM LOCATE FUNCTIONALITY

CROSS-REFERENCE TO RELATED APPLICATION

This is a Continuation of application Ser. No. 13/214,512 filed Aug. 22, 2011. The disclosure of the prior application is hereby incorporated by reference herein in its entirety.

FIELD OF THE INVENTION

The invention is generally related to encoded information reading (EIR) terminals and is specifically related to EIR terminals equipped with RFID reading devices.

BACKGROUND OF THE INVENTION

Radio frequency identification (RFID) methods are widely used in a number of applications, including smart cards, item tracking in manufacturing and retail, etc. An RFID tag can be attached, e.g., to a retail item. An EIR terminal can be equipped with an RFID reader to read and/or modify the memory of an RFID tag attached to a retail item.

SUMMARY OF THE INVENTION

In one embodiment, there is provided an encoded information reading (EIR) terminal comprising a microprocessor, a memory communicatively coupled to the microprocessor, a communication interface, and an RFID reading device configured to output raw message data comprising an encoded message and/or output decoded message data corresponding to an encoded message. The EIR terminal can be configured, responsive to receiving one or more target item identifiers, to attempt to locate at least one RFID tag transmitting an encoded representation of a binary string, at least part of which is equal to at least part one of the specified one or more target item identifiers. The EIR terminal can be further configured, responsive to successfully locating at least one RFID tag, to notify the user via a visual message and/or an audible message.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

In one embodiment, there is provided an encoded information reading (EIR) terminal comprising a radio frequency identifier (RFID) reading device. The EIR terminal can be configured to read RFID tags containing decoded messages. In one embodiment, the RFID terminal can be configured to read an RFID tag containing an encoded message and output raw message data containing the encoded message. In another embodiment, the RFID terminal can be configured to read an RFID tag containing an encoded message and output decoded message data corresponding to the encoded message.

Various embodiments of EIR terminals can be used in a numerous applications, including but not limited to, authentication and access control systems (for example, using smart cards), item tracking in manufacturing and retail, etc. A smart card is an identification card (e.g., a credit card, a pass card) which does not need to be swiped or otherwise physically contacted by a card reader. This capability can be implemented by placing an RFID tag in the card. Item tracking can be implemented by placing an RFID tag on each individual item. Item tracking with RFID tags can be used in loss prevention systems by placing an RFID tag into merchandise items and placing sensors at exit points. If an exit sensor detects a tagged item with a tag, which was not deactivated at the checkout, an alarm can go off. In retail, item tracking with RFID tags can be used in conjunction with other technologies such as bar code scanning and payment terminals.

Of course, devices that read bar codes, read RFID, or read cards bearing encoded information may read more than one of these categories while remaining within the scope of this disclosure. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA that is capable of reading bar codes is referred to as EIR terminal throughout this disclosure.

RFID technology can advantageously be used to locate a tagged item. In one example, illustrated in FIG. 1, a retail customer can use his or her mobile communication device 100 (e.g., a smartphone) to search for an item identifier in a database 151 residing on a remote server 153, and then using the smartphone's built-in RFID reader, locate on the sales floor the item of interest 198 with RFID tag 199 attached to it.

Figure 1:
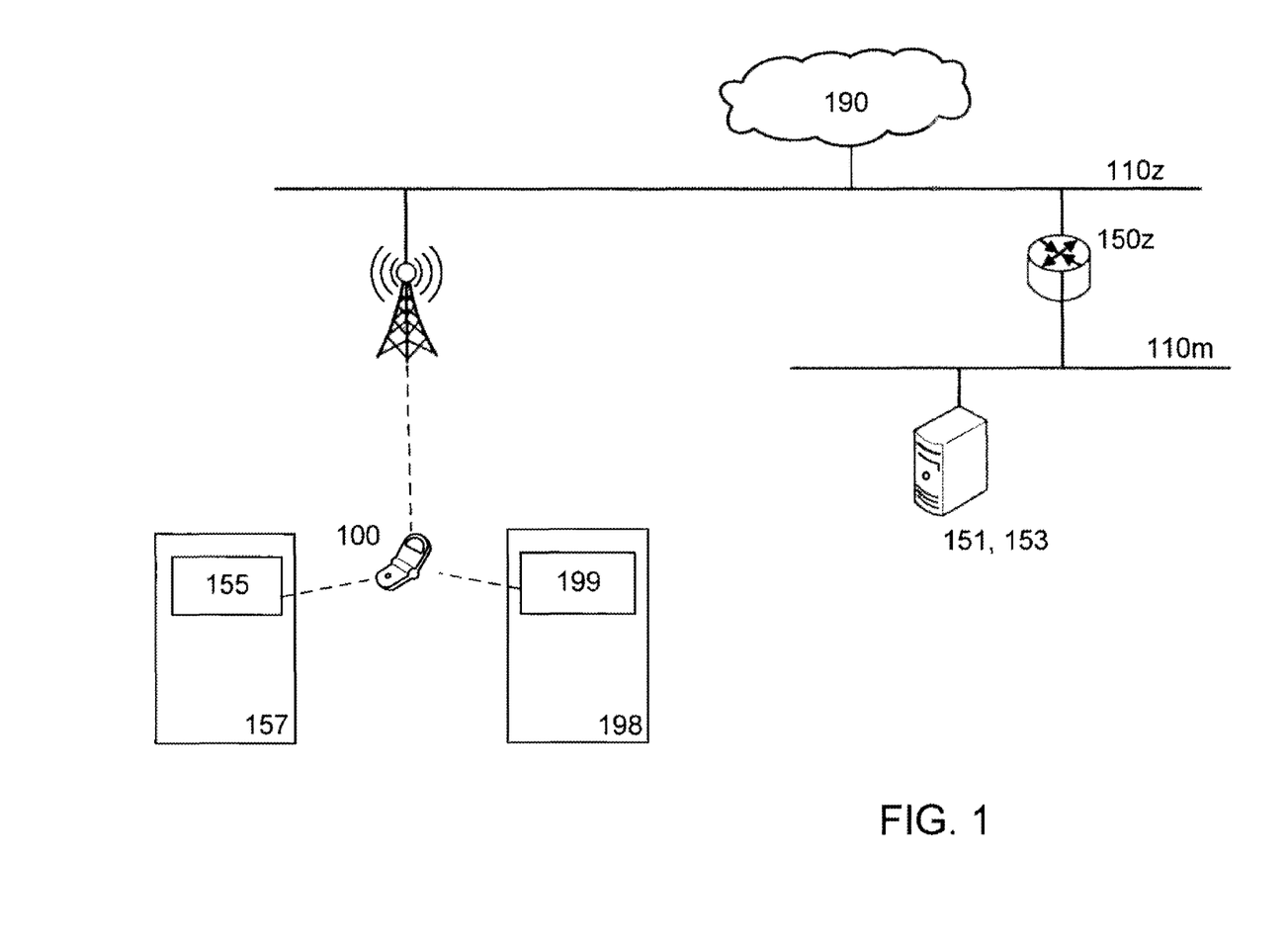
FIG. 1 illustrates use case scenario of an EIR terminal equipped with item locate functionality.

In another example, a retail customer looking to find a particular product, can scan a bar code tag or read RFID tag 155 of any similarly looking product 157 using his or her mobile communication device 100 (e.g., a smartphone). Smartphone 100 can be programmed, responsive to scanning a product tag, to retrieve the product characteristics from an external database 151 that can be provided by the retailer, the product manufacturer, or by a third party. Smartphone 100 can further be programmed to display the retrieved product characteristics and to accept user's input editing the product characteristics. Smartphone 100 can further be programmed, responsive to accepting the user edited product characteristics, to retrieve the product identifier, optionally accompanied by the product availability and pricing, from external database 151. Smartphone 100 can further be programmed, responsive to retrieving the product identifier, to either locate the desired product 198 within the RFID communication range or display a failure message.

In another example, a retail store sales associate can use his or her portable data terminal to search for an item identifier in a store database, and then to locate the item on the sales floor or in a stockroom using the terminal's built-in RFID reader. In a yet another example, a warehouse worker can use his or her portable data terminal to receive an item identifier from a workflow process running on a local or remote server computer, and then to locate the item in the warehouse using the terminal's built-in RFID reader. In a yet another example, an airline passenger can receive an SMS or an MMS containing a tag identifier of an RFID tag attached to his or her luggage, and then to locate the luggage on or around a luggage distributing belt using the RFID reader built-in into his or her smartphone. In a yet another example, luggage tag identifiers can be provided to an airline passenger as part of an electronic boarding pass transferred to the passenger's mobile phone, e.g., via SMS or MMS.

Figure 2:
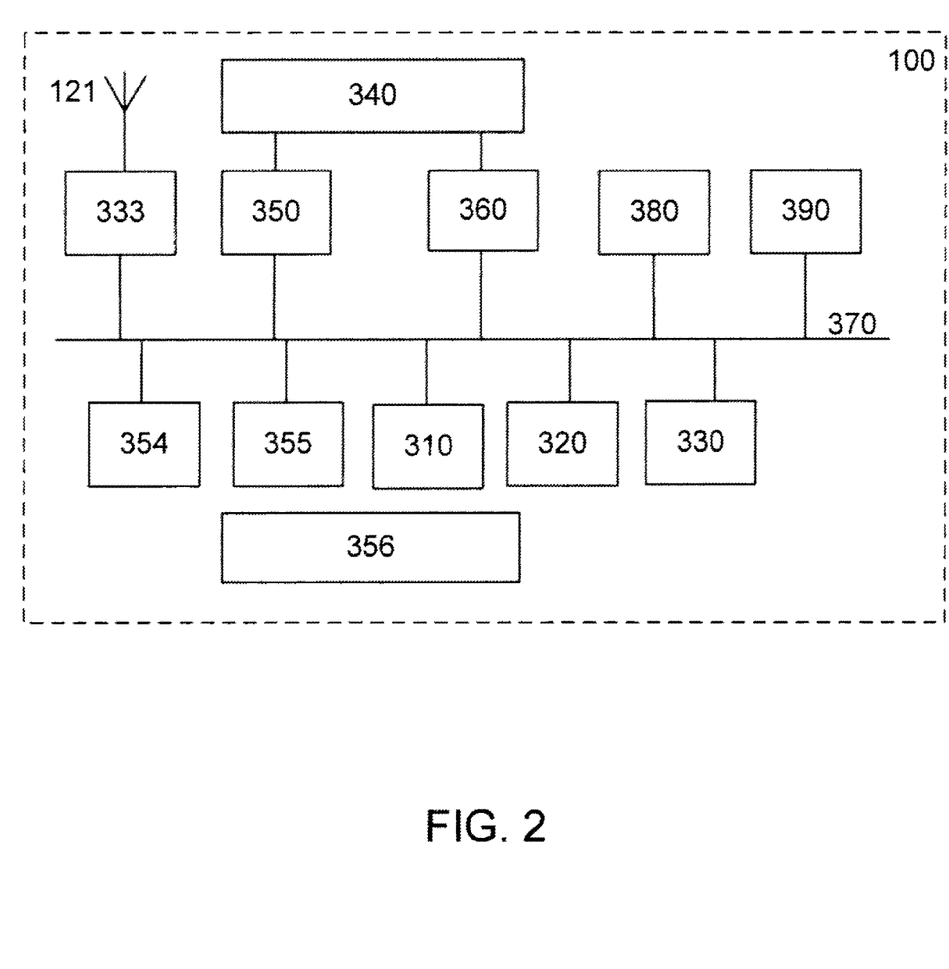
FIG. 2 depicts a component level diagram of one embodiment of an EIR terminal equipped with item locate functionality.

Component-level diagram of one embodiment of EIR terminal 100 is now being described with references to FIG. 2. EIR terminal 100 can comprise at least one microprocessor 310 and a memory 320, both coupled to the system bus 370. Microprocessor 310 can be provided by a general purpose microprocessor or by a specialized microprocessor (e.g., an ASIC). In one embodiment, EIR terminal 100 can comprise a single microprocessor which can be referred to as a central processing unit (CPU). In another embodiment, EIR terminal 100 can comprise two or more microprocessors, for example a CPU and a specialized microprocessor (e.g., an ASIC). In one embodiment, memory 320 can be provided by RAM, ROM, EPROM, and/or SIM card-based memory.

EIR terminal 100 can further comprise one or more EIR devices 330, including a bar code reading device, an RFID reading device, and a card reading device, also coupled to system bus 370. In one embodiment, an EIR reading device can be capable of outputting decoded message data corresponding to an encoded message. In another embodiment, the EIR reading device can output raw message data comprising an encoded message, e.g., raw image data or raw RFID data.

EIR terminal 100 can further comprise a keyboard interface 354 and a display adapter 355, both also coupled to system bus 370. EIR terminal 100 can further comprise a battery 356. In one embodiment, the EIR terminal 100 can further comprise an accelerometer 357. In one embodiment, the EIR terminal 100 can further comprise a GPS receiver 380. In one embodiment, the EIR terminal 100 can further comprise at least one connector 390 configured to receive a subscriber identity module (SIM) card.

Figure 3A:
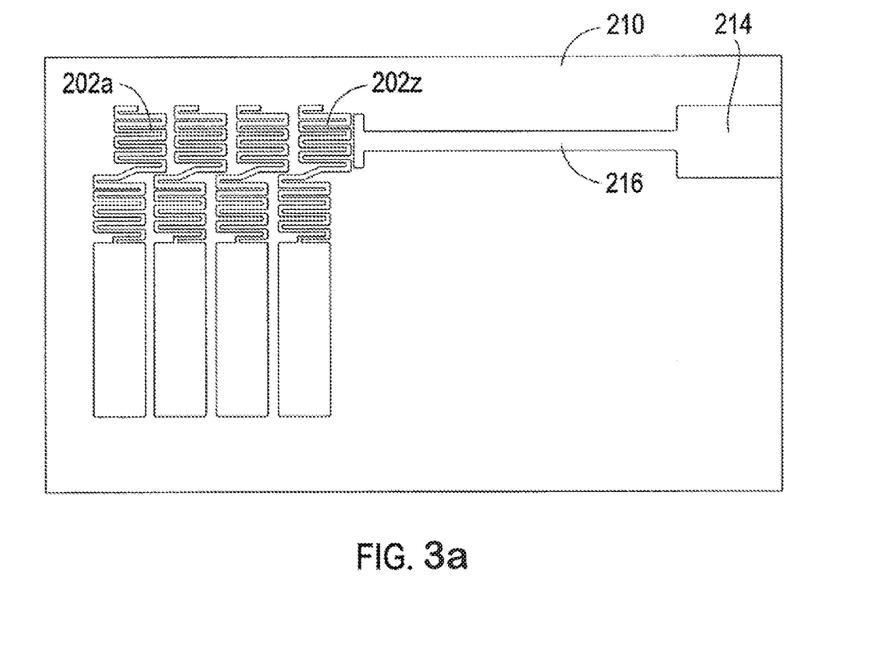
FIGS. 3a-3b illustrate various embodiments of multiple cell metamaterial (MTM) antennas suitable for an EIR terminal equipped with item locate functionality.
Figure 3B:
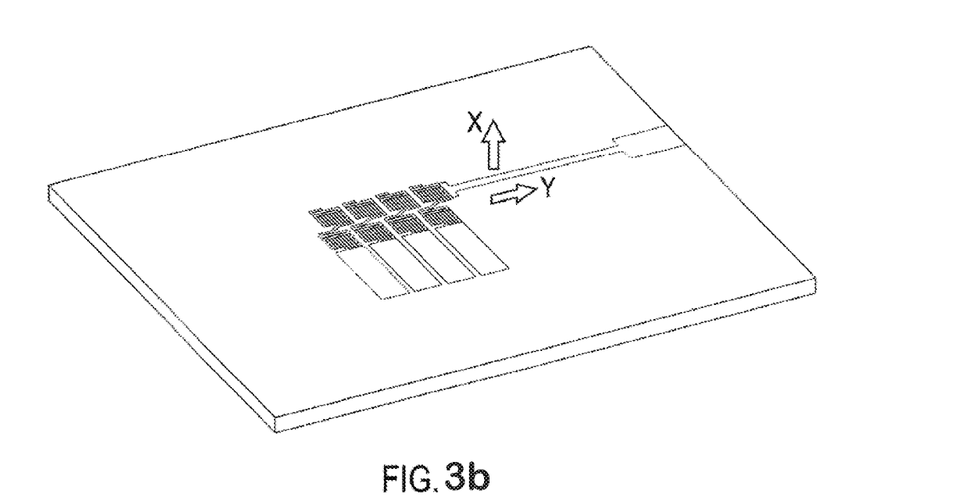

As noted herein supra, in one embodiment, EIR terminal 100 can comprise an RFID reading device 333. In a further aspect, the RFID reading device can comprise an antenna 121. In one embodiment, antenna 121 can be provided by a single-cell or multiple-cell transmission line MTM antenna shown in FIGS. 3a (top view) and 3b (3D view). Antenna 121 can comprise one or more conductive cell patches 202a-202z that can be mounted on a dielectric substrate, provided, for example, by a printed circuit board (PCB) 210. Conductive cell patches 202a-202z can be spatially separated so that capacitive couplings between adjacent cell patches can be created. Antenna 121 can be designed to include a left-hand capacitance of a right-hand inductance. Also disposed on the dielectric substrate 210 can be a feed pad 214 that can be provided, e.g., by a metallic plate and can be connected to a conductive feed line 216. Conductive feed line 216 can be provided, e.g., by metallic a strip. Conductive feed line 216 can be located close but separately from conductive cell patches 202a-202b. A skilled artisan would appreciate the fact that MTM antennas having two or more conductive feed lines are within the scope of this disclosure. A ground plane can be provided by a metallic layer disposed on the bottom side of PCB 210 (not shown in FIG. 3a) or/and on the top side of PCB 210. In one embodiment, each cell patch can be connected to the ground plane via a zigzag line to create a left-hand inductance. In another embodiment, each cell patch can be connected to the ground plane by a via.

Figure 4A:
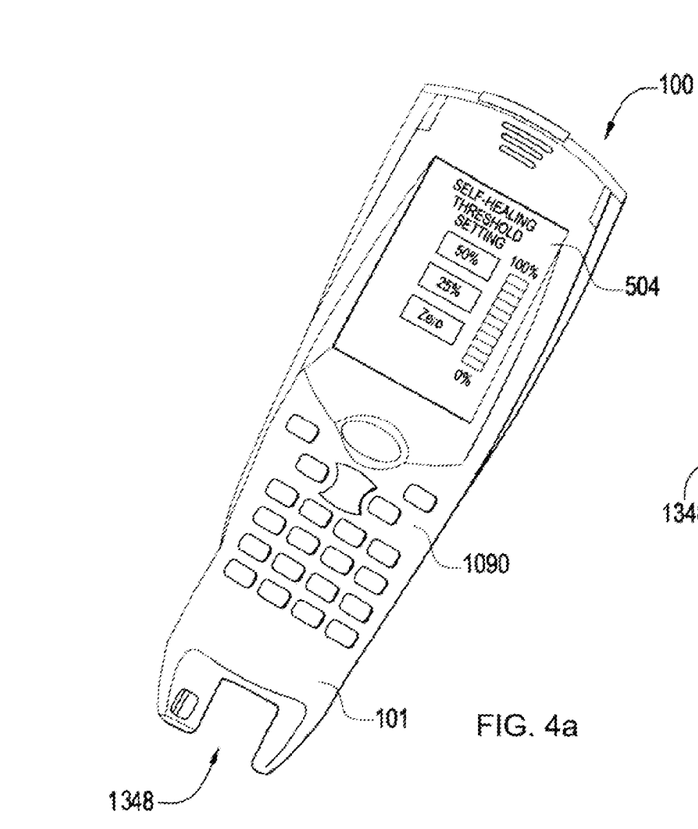
FIGS. 4a-4b and 5 illustrate various embodiments of hand held EIR terminal housings.
Figure 4B:
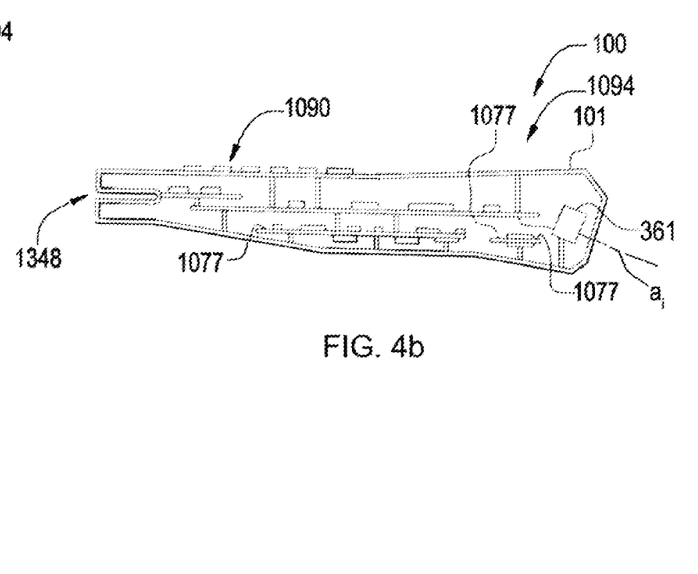
Figure 5:
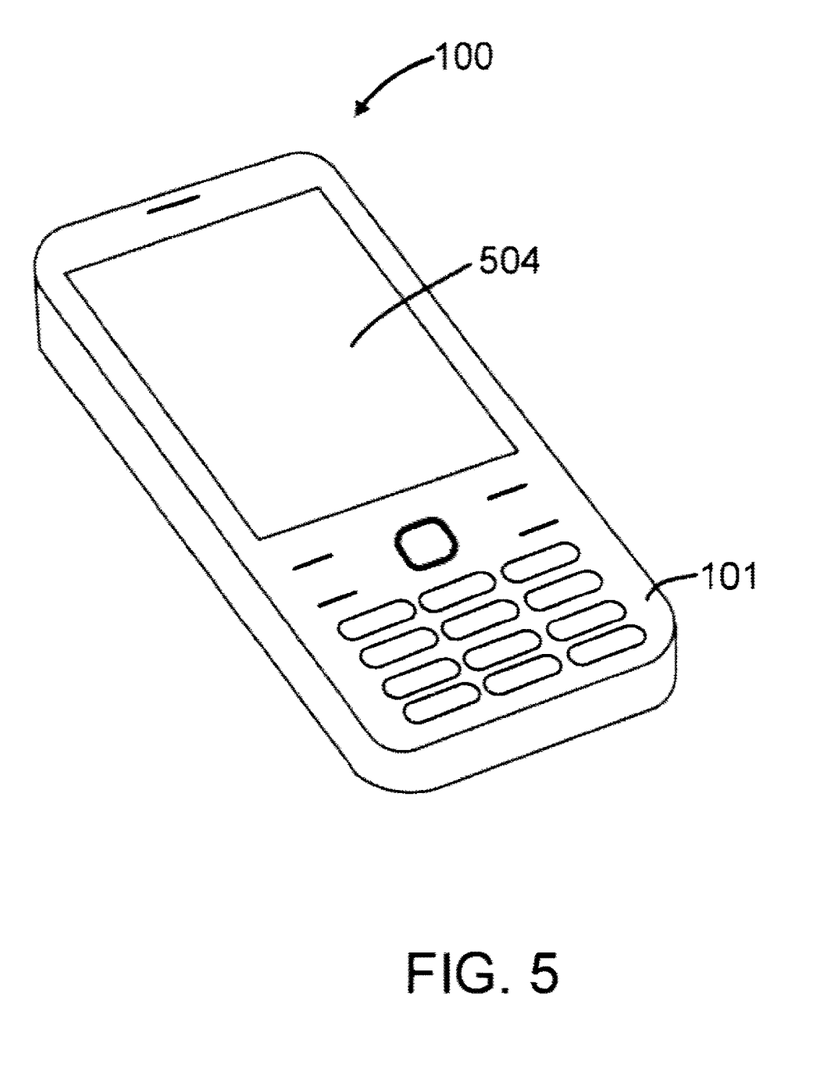

The components of EIR terminal 100 can be incorporated into a variety of different housings of various forms factors. As indicated by the embodiment of FIGS. 4a and 4b, the components of FIG. 2 can be incorporated into a hand held housing 101. EIR terminal 100 of FIGS. 4a and 4b is in the form factor of a hand held portable data terminal. EIR terminal 100 as shown in FIGS. 4a and 4b can include a keyboard 1090, a display 504 having an associated touch screen overlay, a card reader 1348, and an imaging module 361. As indicated by the side view of FIG. 4b, the components of the block diagram of FIG. 2 can be supported within housing 101 on a plurality of circuit boards 1077. In one embodiment, schematically shown in FIG. 5, EIR terminal 100 can be provided by a smartphone. Smartphone 100 can comprise a hand held housing 101, a display 504 having an associated touch screen overlay, and an imaging module (not shown in FIG. 5). A skilled artisan would appreciate the fact that other housings and form factors of EIR terminal 100 are within the scope of this disclosure.

Figure 6:
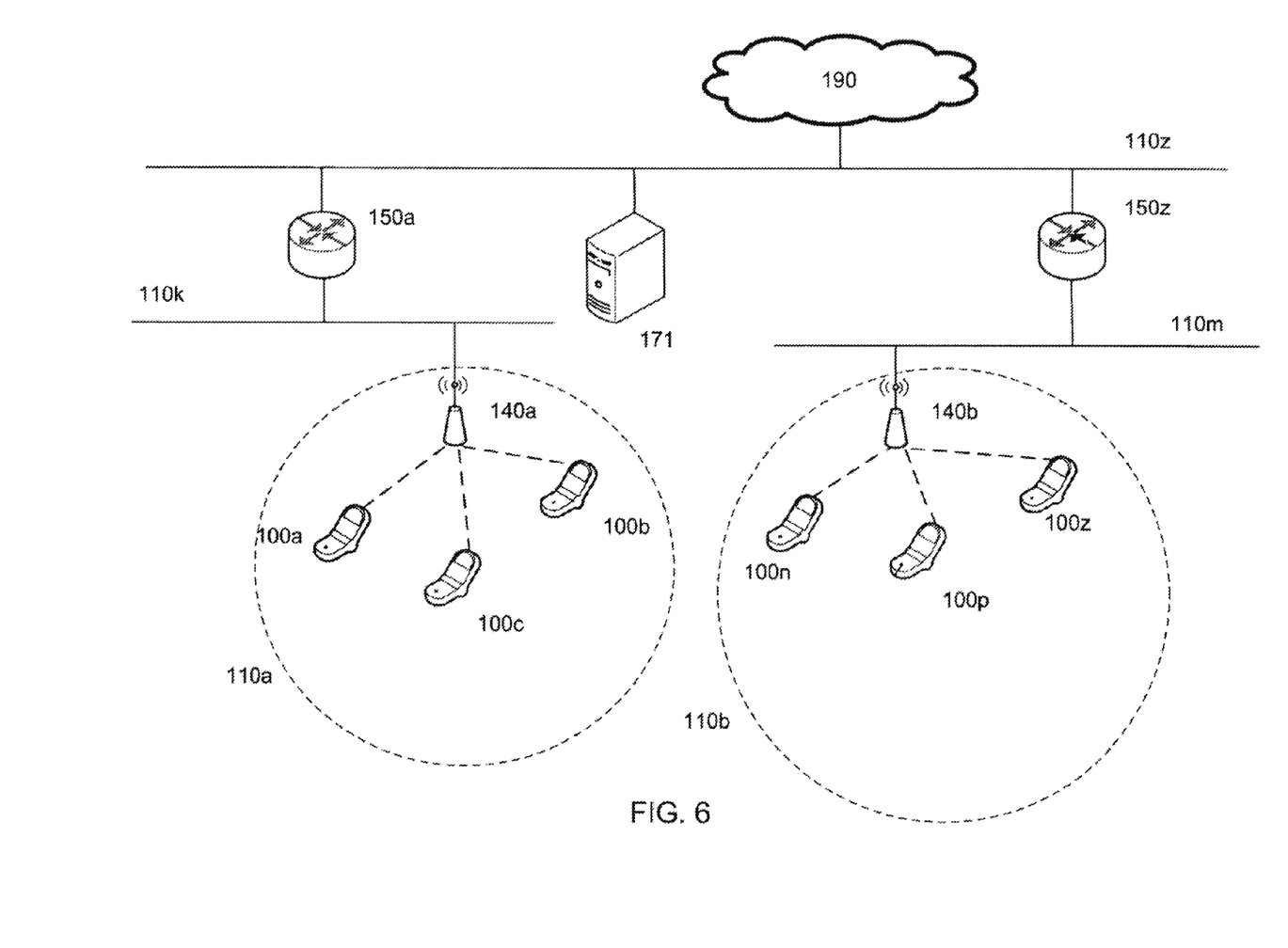
FIG. 6 depicts a network-level layout of a data collection system utilizing EIR terminals equipped with item locate functionality.

In another aspect, EIR terminal 100 can be incorporated in a data collection system. The data collection system, schematically shown in FIG. 6, can include a plurality of EIR terminals 100a-100z in communication with a plurality of interconnected networks 110 a-110z. In one aspect, the plurality of networks 110a-110z can include at least one wireless communication network. In a further aspect, EIR terminal 100 can comprise a communication interface 310 which can be used by the terminal to connect to one or more networks 110a-110z. In one embodiment, the communication interface can be provided by a wireless communication interface.

EIR terminal 100 can establish a communication session with external computer 171. In one embodiment, network frames can be exchanged by the EIR terminal 100 and external computer 171 via one or more routers, base stations, and other infrastructure elements. In another embodiment, external computer 171 can be reachable by the EIR terminal 100 via a local area network (LAN). In a yet another embodiment, external computer 171 can be reachable by EIR terminal 100 via a wide area network (WAN). A skilled artisan would appreciate the fact that other methods of providing interconnectivity between EIR terminal 100c and external computer 171 relying upon LANs, WANs, virtual private networks (VPNs), and/or other types of network are within the scope of this disclosure.

In one embodiment, communications between the EIR terminal 100 and external computer 171 can comprise a series of HTTP requests and responses transmitted over one or more TCP connections. In one embodiment, communications between EIR terminal 100c and external computer 171 can comprise VoIP traffic transmitted over one or more TCP and/or UDP ports. A skilled artisan would appreciate the fact that using other transport and application level protocols is within the scope of this disclosure.

In one aspect, at least one of the messages transmitted by the EIR terminal can include decoded message data corresponding to, e.g., a bar code label or an RFID label attached to an item or a product. For example, an EIR terminal can transmit a request to the host computer to retrieve product-related information corresponding to a product identifier encoded by a bar code label attached to the item, or to transmit an item tacking record for an item identified by a bar code label attached to the item.

In one embodiment, EIR terminal can be configured to interrogate RFID tags located within the RFID communications range. Referring again to FIG. 1, responsive to receiving an interrogation signal transmitted by EIR terminal 100, RFID tag 199 can respond to EIR terminal 100 by backscatter-modulating the amplitude and/or phase of the RFID carrier. The response signal can contain useful data, e.g., an Electronic Product Code (EPC) identifier, or a tag identifier (TID). In one embodiment, an RFID tag can constantly or periodically transmit a signal irrespectively of receiving a query signal from an RFID reader.

In another aspect, the information in RFID tag 199 can be programmed during the manufacturing process (factory programming, typically producing a read-only RFID tag) or after the manufacturing process has been completed (field programming). In a further aspect, the information in RFID tag 199 can be updated dynamically when the tag is in operation.

In another aspect, the distance at which an RFID tag can be read (the read range) can be affected by a number of factors, including the signal frequency, the antenna gain, antenna radiation pattern, the orientation and polarization of the RFID reading device antenna and the RFID tag antenna. In a further aspect, the signal strength of an RFID signal received by EIR terminal 100 from RFID tag 199, combined with some other settings and data, such as reader antenna orientation, reader antenna location, RSSI from other readers, etc., can be indicative of the distance range between EIR terminal 100 and RFID tag 199.

In one embodiment, RFID tag 199 can be compliant with Generation 2 UHF Air Interface Protocol Standard commonly known as the "Gen 2" standard, which defines physical and logical requirements for a passive-backscatter, Interrogator-talks-first (ITF) RFID system operating in the 860 MHz-960 MHz frequency range.

In one embodiment, RFID tag 199 can be configured to store an Electronic Product Code (EPC) identifier and tag identifier (TID). In one embodiment, RFID tag 199 can implement a "kill" function that permanently disables the tag. In one embodiment, RFID tag 199 can be configured to support password-protected access control. In one embodiment, RFID tag 199 can comprise a memory, including read-only and programmable (user) memory. In one embodiment, RFID tag 199 can comprise a non-volatile memory which retains information without the need to electrically power the memory device.

In one embodiment, EIR terminal 100 can transmit information to a passive RFID tag 199 by modulating an RF signal in the 860-960 MHz frequency range. RFID 199 tag can receive both information and operating energy from the RF signal transmitted by EIR terminal 100. EIR terminal 100 can receive information from RFID 199 tag by transmitting a continuous-wave (CW) RF signal to the RFID tag 199. "Continuous wave" can refer to any waveform transmitted by an RFID reading device and suitable to power a passive RFID tag, e.g., a sinusoid at a given frequency. RFID tag 199 can respond by modulating the reflection coefficient of its antenna, thus backscattering an information signal to the EIR terminal 100. RFID tag 199 can modulate the reflection coefficient of its antenna only responsive to receiving an RFID signal from EIR terminal 100.

In a further aspect, EIR terminal 100 can be configured to send information to one or more RFID tags by modulating an RF carrier using double-sideband amplitude shift keying (DSB-ASK), single-sideband amplitude shift keying (DSB-ASK), or phase-reversal amplitude shift-keying (PR-ASK) using a pulse-interval encoding (PIE) format. RFID tag 199 can be configured to receive its operating energy from the same modulated RF carrier.

EIR terminal 100 can be configured to receive information from RFID tag 199 by transmitting an unmodulated RF carrier and listening for a backscatter reply. RFID tag 199 can be configured to transmit information by backscatter-modulating the amplitude and/or phase of the RFID carrier. RFID tag 199 can be configured to encode the backscattered data using, e.g., FMO baseband or Miller modulation of a subcarrier at the data rate. The encoding method to be employed by RFID tag 199 can be selected by EIR terminal 100.

In another aspect, the communication link between EIR terminal 100 and RFID tag 199 can be half-duplex, meaning that RFID tag 199 is not required to demodulate EIR terminal's commands while backscattering.

In another aspect, RFID tag 199 can have a memory comprising one or more memory banks Each of the memory banks can comprise zero or more memory words. In one embodiment, RFID tag 199 can comprise a reserved memory bank containing a kill password and an access password. In one embodiment, RFID tag 199 can comprise an EPC memory bank containing a code (e.g., an EPC code) identifying the object to which the RFID tag is or will be attached. In one embodiment, RFID tag 199 can comprise a TID memory bank containing a tag identifier, tag mode number, tag-specific data, and/or vendor specific data. In one embodiment, RFID tag 199 can comprise a user memory bank containing user-specific data.

In another aspect, the kill password can be provided by a 32-bit value stored in the reserved memory bank. EIR terminal 100 use the kill password once for a given RFID tag, to permanently disable the tag. RFID tag 199 should not execute the kill operation if its kill password has not been initialized. The access password can be provided by a 32-bit value stored in the reserved memory bank. RFID tag 199 having an initialized (non-zero) access password can require EIR terminal 100 to supply the access password before transitioning to a secured state.

In another aspect, EIR terminal can establish one or more sessions with one or more RFID tags. RFID tag 199 can support at least one session-dependent flag for every session. The session-dependent flag can have two states. RFID tag 199 can invert a session-dependent flag responsive to receiving a command from EIR terminal 100. Tag resources other than session-dependent flags can be shared among sessions. In another aspect, an RFID tag can support a selected status flag indicating that the tag was selected by EIR terminal 100.

Referring again to FIG. 1, EIR terminal 100 can be configured to interrogate RFID tags located within the RFID communications range in order to locate at least one RFID tag transmitting an encoded representation of a binary string, at least part of which is equal to at least part one of the specified one or more target item identifiers.

The target item identifier can be in a form of a product code (e.g., an EPC code) or an RFID tag identifier. A skilled artisan would appreciate the fact that other methods of specifying the target item identifier are within the scope of this disclosure. The target item identifier can be inputted into EIR terminal 100 using numerous methods. In one embodiment, the target item identifier can be scanned using the terminal's bar code reading device. In another embodiment, the target item identifier can be keyed-in by a user using the terminal's keyboard or virtual keyboard. In a yet another embodiment, EIR terminal 100 can retrieve the target item identifier by querying external database 151 using search terms (e.g., item description) provided by the user. In one embodiment, the external database can return two or more item identifiers satisfying the specified search terms, and EIR terminal 100 can prompt the user to select one or more target item identifiers from the list of identifiers returned by database 151. In one embodiment, EIR terminal can prompt the user to specify additional search terms and, responsive to receiving the user input, query database 151 using the updated search terms.

In another embodiment, the target item identifier can be specified by a user employing EIR terminal 100 to scan a bar code or an RFID tag of a sample item having at least some similarity with the target item. EIR terminal 100 can be configured, responsive to scanning a bar code or reading an RFID tag, to retrieve corresponding sample item description from external database 151. The sample item description can comprise one or more sample item characteristics. EIR terminal 100 can be further configured to display at least part of the item description retrieved from database 151 and to accept user input editing the item description (e.g., by modifying one or more sample item characteristics). EIR terminal 100 can be further configured to retrieve the target item identifier satisfying the modified description from external database 151. In one embodiment, the target item identifier retrieved from external database 151 can be accompanied by auxiliary item information, such as item availability, location, pricing, etc.

In a further aspect, database 151 can reside on external server 153. In one embodiment, server 153 can be accessed by EIR terminal 100 using the terminal's wireless communication interface. In one embodiment, server 153 can be accessible via the Internet. In another embodiment, server 153 can be accessible via a local network (e.g., a retail store network). A skilled artisan would appreciate the fact that other methods of EIR terminal 100 accessing server 153 are within the scope of this description.

In another embodiment, EIR terminal can be configured to receive the target item identifier via a messaging service, e.g., SMS or MMS. In another embodiment, EIR terminal can be configured to receive the target item identifier via voice command module of the EIR terminal by converting a user voice command into an alphanumeric string containing the target item identifier. A skilled artisan would appreciate the fact that other methods of EIR terminal 100 receiving the target item identifier are within the scope of this disclosure.

As noted herein supra, responsive to receiving the target item identifier, EIR terminal 100 can be configured to interrogate RFID tags located within the RFID communications range in order to locate at least one RFID tag transmitting an encoded representation of a binary string, at least part of which is equal to at least part one of the specified one or more target item identifiers.

Responsive to receiving an interrogation signal transmitted by EIR terminal 100, RFID tag 199 can transmit a response signal back to EIR terminal 100. The response signal can contain useful data, e.g., an Electronic Product Code (EPC) identifier, or a tag identifier (TID). The response signal can include a representation of a binary string, at least part of which is equal to at least part one of the specified one or more target item identifiers.

In one embodiment, EIR terminal can be configured to listen to radio signals at one or more pre-defined frequencies before transmitting tag interrogation signals. In one embodiment, RFID tag 199 can constantly or periodically transmit a signal irrespectively of receiving a query signal from an EIR terminal.

In one embodiment, EIR terminal can implement EPC™ Class-1 Generation-2 UHF RFID Protocol for Communications at 860 MHz-960 MHz by EPCglobal. EIR terminal 100 can interrogate RFID tags using the commands described herein infra.

Select command can be used by EIR terminal 100 to select a particular RFID tag population for the subsequent inventory round. Select command can be applied successively to select a particular tag population based on user-specified criteria. Select command can include the following parameters:

Target parameter indicates whether Select command modifies a tag's SL flag or Inventoried flag, and in the latter case it further specifies one of four available sessions (S0, . . . , S3);

Action parameter indicates whether matching tags assert or deassert SL flag, or set their Inventoried flag to A or B state; tags conforming to the contents of MemBank, Pointer, Length, and Mask parameters are considered to be matching;

Mask parameter contains a bit string that a tag should compare to a memory location specified by MemBank, Pointer, and Length parameters;

MemBank parameter specifies the memory bank to which Mask parameter refers (EPC, TID, or User);

Pointer parameter specifies a memory start location for Mask;

Length parameter specifies the number of bits of memory for Mask; if Length is equal to zero, all tags are considered matching.

Inventory command set can be used by EIR terminal 100 to single out one or more individual tags from a group. A tag can maintain up to four simultaneous sessions and a binary Inventoried flag for each session. Inventory command set includes the following commands:

Query command can be used to initiate and specify an inventory round; it contains a slot counter value (Q=0 to 15) determining the number of slots in the round; the command also includes Sel parameter specifying which tags should respond to the Query.

QueryAdjust command can be used to adjust the value of the tag's slot counter Q without changing any other parameters;

QueryRep command can be used to repeat the last Query command;

Ack command can be used to acknowledge a tag's response;

Nak command can be used to force a tag to change its state to Arbitrate.

An RFID tag can implement a state machine. Once energized, a tag can change its current state to Ready. A selected tag can, responsive to receiving Query command, select a random integer from the range of [0; 2Q-1]. If the value of zero is selected, the tag can transition to Reply state, backscaterring a 16-bit random number. If a non-zero value is selected, the tag can load the selected random integer into its slot counter and change its state to Arbitrate.

Responsive to receiving the tag transmission, EIR terminal can acknowledge it with Ack command containing the same random number. Responsive to receiving Ack command, the tag can change its state to Acknowledged and backscatter its protocol control (PC) bits, EPC and cyclic redundancy check (CRC) value. Unacknowledged tag can select a new random integer from the range of [0; 2Q-1], load the value into its slot counter, and change its state to Arbitrate. Responsive to receiving QueryAdjust command, a tag in the Arbitrate state should decrement the value of its slot counter and backscatter its protocol control (PC) bits, EPC and CRC value if its slot counter is equal to zero.

Responsive to receiving the tag's transmission of its PC, EPC and 16-bit CRC value, EIR terminal can send a QueryAdjust command causing the tag to invert its Inventoried flag and to transition to Ready state.

Access command set can be used by EIR terminal 100 for communicating with (reading from and writing to) a tag. An individual tag must be uniquely identified prior to access. Access command set includes the following commands:

ReqRn command can be used by EIR terminal 100 to request a handle from a tag; the handle can be used in the subsequent Access command set commands. Responsive to receiving Req_RN commands, a tag returns a 16-bit random integer (handle) and transitions from Acknowledged to Open or Secured state.

Read command can be used by EIR terminal 100 to read tag's Reserved, EPC, TID and User memory;

Write command can be used by EIR terminal 100 to write to tag's Reserved, EPC, TID and User memory;

Kill command can be used by EIR terminal 100 to permanently disable a tag;

Lock command can be used by EIR terminal 100 to lock passwords preventing subsequent read or write operations; lock individual memory banks preventing subsequent write operations; permanently lock the lock status of passwords or memory banks;

Access command can be used by EIR terminal 100 to cause a tag having a non-zero access password to transition from Open to Secured state.

A skilled artisan would appreciate the fact that other methods of interrogating RFID tags by EIR terminal 100 are within the scope of this disclosure.

In a further aspect, EIR terminal 100 can be configured, responsive to successfully locating at least one RFID tag satisfying the search condition (i.e., a tag transmitting an encoded representation of a binary string, at least part of which is equal to at least part one of the specified one or more target item identifiers), to notify the user of EIR terminal 100 of a successful search via a visual message and/or an audible message. A visual Successful Search message can be displayed on display 504 of EIR terminal 100. An audible Successful Search message can be in a form of a generated voice message or a user-configurable sound.

In one embodiment, EIR terminal can be configured to sense its spatial movement using accelerometer 357. In one embodiment, EIR terminal 100 can be configured, responsive to sensing a spatial movement of said EIR terminal, to repeatedly attempt to locate at least one RFID tag satisfying the search condition.

In one embodiment, EIR terminal 100 can be configured, responsive to failing to locate within a pre-defined period of time at least one RFID tag satisfying the search condition, to notify the user of EIR terminal 100 of an unsuccessful search attempt via a visual message and/or an audible message. A visual Unsuccessful Search Attempt message can be displayed on display 504 of EIR terminal 100. In one embodiment, the visual message can indicate an approximate range within which the target item could not be located. An audible successful search message can be in a form of a generated voice message or a user-configurable sound.

In one embodiment, at least part of the above described item locate functionality can be implemented by one or more computer programs executed by microprocessor 310 of FIG. 2. In one embodiment, at least part of the above described functionality can be implemented by one or more hardware components of EIR terminal 100 of FIG. 2. In one embodiment, one or more computer programs implementing the above described item locate functionality can be executed by microprocessor 310 of FIG. 2 in parallel with executing other computer programs, including system and/or application computer programs. In one embodiment, one or more computer programs implementing the above described item locate functionality can be executed by two or more microprocessors.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A small sample of systems methods and apparatus that are described herein is as follows:

A1. An encoded information reading (EIR) terminal comprising:
a microprocessor;
a memory communicatively coupled to said microprocessor;
a communication interface;
an RFID reading device configured to perform at least one of: outputting raw message data comprising an encoded message and outputting decoded message data corresponding to an encoded message;
wherein said EIR terminal is configured, responsive to receiving one or more target item identifiers, to attempt to locate at least one RFID tag transmitting an encoded representation of a binary string;
wherein at least part of said binary is equal to at least part of one of said one or more target item identifiers;
wherein said EIR terminal is further configured, responsive to successfully locating said at least one RFID tag, to notify a user of said EIR terminal via at least one of: a visual message and an audible message.

A2. The EIR terminal of A1, wherein said RFID reading device comprises an antenna fabricated of a material having a composite right- and left-handed (CRLH) structure.

A3. The EIR terminal of A1, wherein said target item identifier is provided by at least one of: a product code, an EPC code, a tag identifier, and an alphanumeric string.

A4. The EIR terminal of A1, further comprising a graphical user interface (GUI) configured to receive one or more target item characteristics.

A5. The EIR terminal of A1, further comprising a graphical user interface (GUI) configured to receive one or more target item characteristics;
wherein said EIR terminal is further configured, responsive to receiving said one or more target item characteristics, to receive said target item identifier by querying an external database via said communication interface for at least one item identifier corresponding to an item conforming to said one or more target item characteristics.

A6. The EIR terminal of A1, further configured, responsive to reading by said RFID reading device a decoded message comprising a sample item identifier, to query an external database via said communication interface for a description of a sample item identified by said sample item identifier, said description comprising one or more sample item characteristics;

wherein said EIR terminal is further configured to display via a GUI at least part of said description;

wherein said EIR terminal is further configured to receive a user input specifying one or more target item characteristics by modifying at least one of said one or more sample item characteristics; and wherein said EIR terminal is further configured, responsive to receiving said user input, to receive said target item identifier by querying an external database via said communication interface for at least one item identifier corresponding to an item conforming to said target item characteristics.

A7. The EIR terminal of claim A1, further configured, responsive to successfully locating said at least one RFID tag, to notify a user of said EIR terminal via at least one of: a visual message indicative of a distance to said at least one RFID tag and an audible message indicative of a distance to said at least one RFID tag.

A8. The EIR terminal of A1, further configured, responsive to sensing a spatial movement of said EIR terminal, to repeatedly attempt to locate said at least one RFID tag.

A9. The EIR terminal of A1, further configured, responsive to failing to locate said at least one RFID tag, to notify a user of said EIR terminal via at least one of: a visual message indicative of a range within which said at least one RFID tag could not be located and an audible message indicative of a range within which said at least one RFID tag could not be located.

A10. The EIR terminal of A1, further comprising an EIR device selected from the group consisting of: a bar code reading device and a card reading device, said EIR device configured to perform at least one of: outputting raw message data comprising an encoded message and outputting decoded message data corresponding to an encoded message.

A11. The EIR terminal of A1, further comprising an EIR device selected from the group consisting of: a bar code reading device and a card reading device, said EIR device configured to perform at least one of: outputting raw message data comprising an encoded message and outputting decoded message data corresponding to an encoded message;

wherein said EIR terminal is further configured to responsive to reading by said EIR device a decoded message comprising an item identifier, to query an external database via said communication interface for a description of an item identified by said item identifier, said description comprising one or more sample item characteristics;

wherein said EIR terminal is further configured to display via a GUI at least part of said description;

wherein said EIR terminal is further configured to receive a user input specifying one or more target item characteristics by modifying at least one of said one or more sample item characteristics; and wherein said EIR terminal is further configured, responsive to receiving said user input, to receive said target item identifier by querying an external database via said communication interface for at least one item identifier corresponding to an item conforming to said target item characteristics.

A12. The EIR terminal of A1, wherein said EIR terminal is provided by one of: a portable EIR terminal, a bar code reading terminal, a mobile phone, a smart phone, a tablet computer.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

What is claimed is:

1. An apparatus comprising:
    a communication interface comprising a graphical user interface that:
        displays one or more characteristics of a first item of interest, wherein the first item of interest is associated with a second item of interest;
        receives user input to modify at least one of the one or more characteristics of the first item of interest;
    a processor that:
        determines an identifier associated with the second item of interest based on the modified one or more characteristics of the first item of interest; and
    an radio frequency identification (RFID) reader that:
        transmits an RF interrogation signal that is configured to activate an RFID tag corresponding to the identifier if the RFID tag is within range of the RF interrogation signal; and
        generates a notification that the item associated with the selected identifier is within a range of the RFID reader.

2. The apparatus of claim 1, wherein said RFID reader comprises an antenna fabricated of a material having a composite right- and left-handed (CRLH) structure.

3. The apparatus of claim 1, wherein the identifier is provided by at least one of: a product code, an EPC code, a tag identifier, a pictorial identifier and an alphanumeric string.

4. The apparatus of claim 1, wherein the graphical user interface (GUI) is configured to receive one or more target item characteristics.

5. The apparatus of claim 1, wherein the graphical user interface (GUI) is configured to receive one or more target item characteristics; wherein said apparatus is further configured, responsive to receiving said one or more target item characteristics, to receive said identifier by querying an external database via said communication interface for at least one item identifier corresponding to an item conforming to said one or more target item characteristics.

6. The apparatus of claim 1, further configured, responsive to successfully locating said RFID tag, to notify a user of said apparatus via at least one of: a visual message indicative of a distance to said RFID tag and an audible message indicative of a distance to said RFID tag.

7. The apparatus of claim 1, further configured, responsive to sensing a spatial movement of said apparatus, to repeatedly attempt to locate said RFID tag.

8. The apparatus of claim 1, further configured, responsive to failing to locate said RFID tag, to notify a user of said apparatus via at least one of: a visual message indicative of a range within which said RFID tag could not be located and an audible message indicative of a range within which said RFID tag could not be located.

9. The apparatus of claim 1, further comprising an EIR device selected from the group consisting of: a bar code reading device and a card reading device, said EIR device configured to perform at least one of: outputting raw message data comprising an encoded message and outputting decoded message data corresponding to an encoded message.

10. The apparatus of claim 1, wherein said apparatus is provided by one of: a portable RFID terminal, a bar code reading terminal, a mobile phone, a smart phone, or a tablet computer.

11. The apparatus of claim 1, wherein the identifier of the RFID tag is selected by scanning a bar code and using the scanned bar code data as the selected identifier.

12. A method comprising:
displaying, on a graphical user interface, one or more characteristics of a first item of interest, wherein the first item of interest is associated with a second item of interest;
receiving user input to modify at least one of the one or more characteristics of the first item of interest;
querying, in response to receiving the modified characteristics, a database of target item identifiers;
retrieving, from the database, an identifier in the database satisfying the modified characteristics; and
transmitting an RF interrogation signal in response to receipt of the identifier, where the RF interrogation signal is configured to activate an radio frequency identifier (RFID) tag corresponding to the identifier if the RFID tag is within range of the RF interrogation signal; and
generating a notification indicating the presence of the queried item within the vicinity of the RFID reader.

13. The method of claim 12, wherein further comprising:
interrogating, using an RFID reader, RFID tags in an area corresponding to the identifier in response to receiving the identifier in the database satisfying the modified characteristics; and
receiving an encoded representation of a data string from at least one RFID tag, wherein at least part of said data string is equal to at least part of the identifier.

14. The method of claim 12, further comprising:
responsive to reading a decoded message comprising an item identifier, querying an external database via a communication interface for a description of an item identified by said item identifier, said description comprising one or more sample item characteristics;
displaying via the graphical user interface at least part of said description;
receiving a user input specifying one or more target item characteristics by modifying at least one of said one or more sample item characteristics; and
responsive to receiving said user input, receiving an item identifier corresponding to an item conforming to said one or more target item characteristics by querying the external database via said communication interface.

15. The method of claim 12, further comprising: displaying a graphical user interface for a user to enter search terms associated with an object: interrogating, using an RFID reader, RFID tags in an area corresponding to at least one target item identifier in response to receiving at least one target item identifier in the database satisfying the specified search terms of the database; and receiving, an encoded representation of a data string from at least one RFID tag, wherein at least part of said data string is equal to at least part of the at least one target item identifier.

16. An radio frequency identification (RFID) reader comprising:
a communication interface with a graphical user interface configured to:
display one or more characteristics of a first item of interest, wherein the first item of interest is associated with a second item of interest;
receive user input to modify at least one of the one or more characteristics of the first item of interest;
a processor configured to:
determine an identifier associated with the second item of interest based on the modified one or more characteristics of the first item of interest;
transmit an RF interrogation signal that is configured to activate the RFID tag corresponding to the identifier if the RFID tag is within range of the RF interrogation signal; and
generates a notification that the item associated with the selected identifier is within a range of the RFID reader, where at least part of the RFID signal is associated with at least part of the selected identifier.

17. The RFID reader of claim 16, wherein the identifier is provided by at least one of: a product code, an EPC code, a tag identifier, a pictorial identifier and an alphanumeric string.

18. The RFID reader of claim 16, wherein the selecting of the identifier comprises receiving one or more target item characteristics.

19. The RFID reader of claim 16,
wherein the graphical user interface (GUI) is configured to receive one or more target item characteristics,
wherein said RFID reader is further configured, responsive to receiving said one or more target item characteristics, to receive said identifier by querying an external database via said communication interface for at least one item identifier corresponding to an item conforming to said one or more target item characteristics.

20. The RFID reader of claim 16, further configured, responsive to successfully locating said RFID tag, to notify a user of said apparatus via at least one of: a visual message indicative of a distance to said RFID tag and an audible message indicative of a distance to said RFID tag.

* * * * *